US010827165B2

(12) United States Patent
Ratcliff et al.

(10) Patent No.: US 10,827,165 B2
(45) Date of Patent: Nov. 3, 2020

(54) ENHANCED IMAGING FOR THIN FORM FACTOR HEAD MOUNTED DISPLAYS AND NEAR LIGHT FIELD DISPLAYS

(71) Applicant: Intel Corporation, Santa Clara, CA (US)

(72) Inventors: Joshua Ratcliff, San Jose, CA (US); Alexey Supikov, San Jose, CA (US); Santiago Alfaro, Santa Clara, CA (US); Basel Salahieh, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/992,689

(22) Filed: May 30, 2018

(65) Prior Publication Data

US 2019/0045176 A1 Feb. 7, 2019

(51) Int. Cl.
*H04N 13/344* (2018.01)
*H04N 13/307* (2018.01)
*G02B 27/01* (2006.01)
*G02B 30/36* (2020.01)

(52) U.S. Cl.
CPC ....... *H04N 13/344* (2018.05); *G02B 27/0172* (2013.01); *G02B 30/36* (2020.01); *H04N 13/307* (2018.05); *G02B 2027/0123* (2013.01); *G02B 2027/0134* (2013.01); *H04N 2213/001* (2013.01)

(58) Field of Classification Search
CPC ........ G02B 27/2214; G02B 2027/0134; G02B 2027/014; G02B 2027/0178; G02B 27/0093; G02B 27/01; G02B 27/017; G02B 27/0172; G02B 27/22; G02B 27/2235; G02B 3/005; G02B 5/1885; G02B 5/32; G02B 2027/0123; G02B 27/2242; H04N 13/239; H04N 13/286; H04N 13/305; H04N 13/307; H04N 13/349; H04N 13/344; H04N 2213/001
USPC ........................................ 348/51–54; 349/15
See application file for complete search history.

(56) References Cited

U.S. PATENT DOCUMENTS

| 5,748,375 A * | 5/1998 | Yamana ............... G02B 3/0056 359/621 |
| 2002/0196554 A1* | 12/2002 | Cobb ................. G02B 27/0172 359/633 |
| 2004/0141157 A1* | 7/2004 | Ramachandran ...... G02B 17/06 353/70 |

(Continued)

OTHER PUBLICATIONS

Yu "An Embedded Camera Lens Distortion Correction Method for Mobile Computing Applications " 2003 IEEE, 8 pages. (Year: 2003).*

*Primary Examiner* — Nathnael Aynalem
(74) *Attorney, Agent, or Firm* — Green, Howard & Mughal LLP.

(57) ABSTRACT

Systems, devices, and techniques related to thin form factor head mounted displays and near light field displays are discussed. Such devices may include a display to present elemental images, a primary lens array in an optical path between the display and a viewing zone of a user, the primary lens array to magnify elemental images to a viewing zone, and a secondary array of optical elements between the display and the primary lens array to concentrate elemental images from the display to the primary lens array.

24 Claims, 9 Drawing Sheets

(56) References Cited

U.S. PATENT DOCUMENTS

| | | | |
|---|---|---|---|
| 2005/0111100 A1* | 5/2005 | Mather | G02F 1/1323 359/464 |
| 2009/0195873 A1* | 8/2009 | Kubara | G02B 5/32 359/463 |
| 2013/0307929 A1* | 11/2013 | Hattori | H04N 19/597 348/43 |
| 2015/0116389 A1* | 4/2015 | Watanabe | G09G 3/3426 345/694 |
| 2017/0171533 A1* | 6/2017 | Benitez | H04N 13/383 |
| 2018/0053284 A1* | 2/2018 | Rodriguez | G06T 5/006 |
| 2019/0086722 A1* | 3/2019 | Shirokawa | G06F 1/163 |

* cited by examiner

ENHANCED IMAGING FOR THIN FORM FACTOR HEAD MOUNTED DISPLAYS AND NEAR LIGHT FIELD DISPLAYS

BACKGROUND

Head-mounted displays (HMDs) may be used to present virtual reality scenes to users. For example, HMDs may display a pair of images rendered for each eye that may be refreshed with movement of the head to present users with a three-dimensional (3D) virtual environment. In particular, near-eye light field displays implemented by HMDs reduce the size of the HMDs over HMDs with conventional optics, which are bulky, heavy, and of limited field of view (FOV). Near-eye light field displays provide thin, lightweight HMDs that present 3D scenes to users.

In implementing near-eye light field displays, challenges arise in achieving sharp high resolution imaging with a large field of view (FOV) due to tradeoffs in attaining maximum screen pixel utilization, sharp optical performance everywhere in the device, and very large FOV. Such challenges typically present themselves as a tradeoff between sharp but blocky images or blurry images at varying FOVs.

Therefore, current techniques do not provide for high quality imaging for virtual scenes in near-eye light field HMDs. It is with respect to these and other considerations that the present improvements have been needed. Such improvements may become critical as the desire to utilize virtual reality HMDs becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
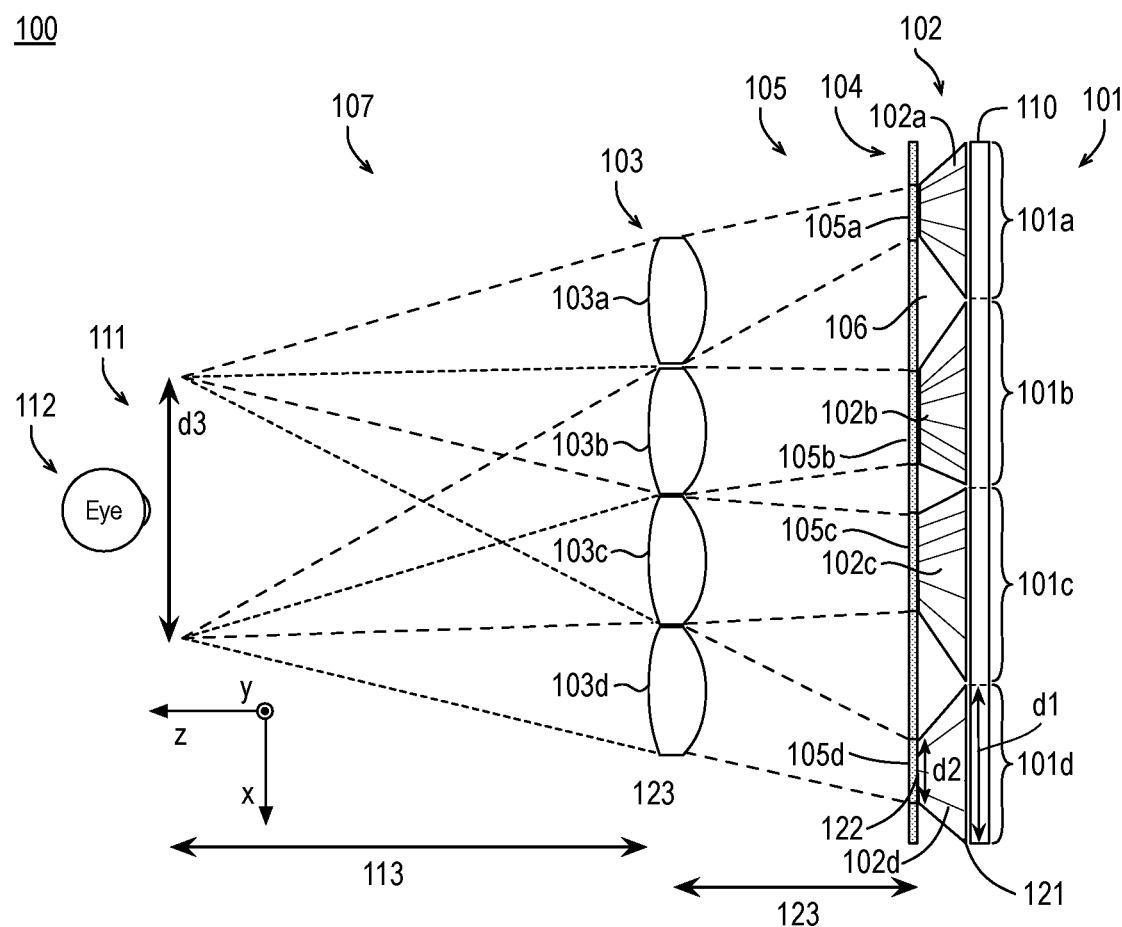
FIG. 1 illustrates an example virtual reality imaging device including an array of bundles of fiber optics between a display and a primary lens array.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or such embodiments, or examples, etc., indicate that the implementation, embodiment, or example described may include a particular feature, structure, or characteristic, but every implementation, embodiment, or example may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to affect such feature, structure, or characteristic in connection with other implementations whether or not explicitly described herein. The terms "substantially," "close," "approximately," "near," and "about," generally refer to being within +/−10% of a target value.

Methods, devices, apparatuses, computing platforms, and articles are described herein related to displaying stereo images for virtual reality and, in particular, to a secondary array of optical elements between a display and a primary lens array to provide increased pixel utilization of the display for improved optical performance.

As described above, in some contexts, challenges arise in implementing head-mounted displays for virtual reality with a large field of view (FOV) due to tradeoffs in attaining maximum screen pixel utilization, sharp optical performance everywhere in the device, and very large FOV. One aspect of such tradeoffs is the space-bandwidth product of an optical system, which characterizes the tradeoff in improving spatial resolution (i.e., as measured by point spread function, PSF, of field points) at the cost of reducing FOV and pixels utilization (i.e., reducing elemental image sizes) and vice versa. In embodiments discussed herein, an apparatus may include a display to present a plurality of elemental images, a primary lens array in an optical path between the display and a viewing zone of a user, each lens of the primary lens array to magnify an elemental image within a receiving zone of the lens to a viewing zone of a user, and a secondary array of optical elements in the optical path of the display and between the display and the primary lens array, each optical element of the secondary array of optical elements to concentrate a particular elemental image from the display to the receiving zone of a corresponding lens of the primary lens array. As used herein, an elemental image is an image of a set of images displayed via a display in a virtual reality imaging device such as an HMD. The display may be flat or curved as discussed herein. The primary lens array may include a plurality of lenslets such as an array of heterogeneous freeform lenses. The secondary array of optical elements may include any array as discussed herein such as an array of bundles of tapered optical fibers, an array of heterogeneous plano-concave field lenslets, an array of biconvex lenslets, or an array of plano-convex lenslets.

As discussed, the secondary array of optical elements is between the display and the primary lens array. In some embodiments, the secondary array of optical elements is physically coupled (e.g., attached) to a surface of the display and is physically decoupled (e.g., not attached to and physically separated from the primary lens array. As used herein the term physically decoupled indicates two objects are not in physical contact and instead have another object or an air gap therebetween. Notably, the secondary array of optical elements is not attached to the primary lens array such that the lens array structure is not a doublet structure (e.g., a doublet structure having two lenses physically coupled to one another). The structures and techniques discussed herein overcome the discussed tradeoffs of attaining maximum screen pixel utilization, sharp optical performance everywhere in the device, and very large FOV. Such HMDs may thereby simultaneously offer thin form factor, very wide FOV, sharp optical imaging, and high quality angular resolution.

FIG. 1 illustrates an example virtual reality imaging device 100 including an array of bundles of fiber optics between a display and a primary lens array, arranged in accordance with at least some implementations of the present disclosure. As shown in FIG. 1, virtual reality imaging device 100 includes a display 110 to present elemental images 101, a secondary array of optical elements 102, and a primary lens array 103. Furthermore, virtual reality imaging device 100 has an optical path 107 between display 110 and a viewing zone 111 (or eye box) for an eye 112 of a user. As will be appreciated, virtual reality imaging device 100 and other virtual reality imaging devices discussed herein also includes a second display to present second elemental images, a second secondary array of optical elements, and a second primary lens array in analogy to display 110, secondary array of optical elements 102, and primary lens array 103 for a second eye of the user, which are not illustrated for the sake of clarity. Such components may be implemented via independent eye pieces for each eye of a user. For example, the first and second eye pieces may each include a display, a secondary array of optical elements discussed herein, and a primary lens array having any characteristics discussed herein.

Virtual reality imaging device 100 includes viewing zone 111 (or eye box) for eye 112 at a designated eye relief 113 (e.g., about 10-25 mm) from primary lens array 103. As used herein, a viewing zone or eye box is defined as a region spanned by a continuously moving eye 112 (e.g., due to shifts and/or rotations) in which all elemental images 101 (e.g., active imaging regions of display 101) as seen through their related lenslets of primary lens array 103 are simultaneously visible to eye 112. For example, each lens of primary lens array 103 provides an elemental image (or at least a portion thereof) of elemental images 101 of display 110 spanning the entirety of viewing zone 111. Furthermore, as used herein an optical path is defined as a path extending between a displayed image (e.g., via a display) and a viewing zone.

Display 110 may include any suitable display such as a liquid-crystal display (LCD), a light emitting diode display, or an organic light emitting diode (OLED) display. In some embodiments, display 110 is a flat or planar display (as illustrated in FIG. 1). In some embodiments, display 110 is a curved display as discussed further herein. In some embodiments, display 110 includes a screen (generally illustrated as display 110) as well as other components such drive circuitry, backlight elements, etc. which are not shown for the sake of clarity of presentation.

Primary lens array 103 may include any array of lenslets 103a, 103b, 103c, 103d such that each of lenslets 103a, 103b, 103c, 103d receive from a corresponding receiving zone 105a, 105b, 105c, 105d, a concentrated elemental image (not labeled) as provided by a corresponding optical element 102a, 102b, 102c, 102d of secondary array of optical elements 102. In an embodiment, lenslets 103a, 103b, 103c, 103d resolve pixel features on display 110. In some embodiments, primary lens array 103 is a flat or planar primary lens array (as illustrated in FIG. 1). In some embodiments, primary lens array 103 is a curved display as discussed further herein. In some embodiments, lenslets 103a, 103b, 103c, 103d comprise freeform lenses such that primary lens array 103 is a heterogeneous array of freeform lenses (e.g., with each of lenslets 103a, 103b, 103c, 103d having a unique shape). As used herein, a receiving zone is a zone, field, or region corresponding to a lens such that the optical element receives an image in the receiving zone and translates it to an output zone of the optical element. In the example of FIG. 1, secondary array of optical elements 102 translates elemental images 101 to an intermediate image plane 104 having portions corresponding to receiving zones 105a, 105b, 105c, 105d and zones 106 that are not within any of receiving zones 105a, 105b, 105c, 105d. Notably, any image information within zones 106 is not translated to viewing zone 111. Absent secondary array of optical elements 102, zones 106 would be within display 110 such that pixels of display 110 within zones 106 would be wasted pixels.

Second array of optical elements 102 may include any array of optical elements 102a, 102b, 102c, 102d such that each of optical elements 102a, 102b, 102c, 102d receives a corresponding elemental image 101a, 101b, 101c, 101d of elemental images 101 and concentrates elemental image 101a, 101b, 101c, 101d from display 110 to receiving zone 105a, 105b, 105c, 105d of lenslets 103a, 103b, 103c, 103d. For example, optical elements 102a, 102b, 102c, 102d concentrate or de-magnify elemental images 101 for use by primary lens array 103. Optical elements 102 may be characterized as field elements. In virtual reality imaging device 100 (and other virtual reality imaging devices discussed herein), secondary array of optical elements 102 augment primary lens array 103. In some embodiments, secondary array of optical elements 102 are heterogeneous optical elements (e.g., heterogeneously designed optical field elements). Secondary array of optical elements 102 are between display 110 and primary lens array 103 and in optical path 107. Secondary array of optical elements 102 (e.g., a secondary array with respect to primary lens array 103) are not attached to nor immediately adjacent to primary lens array 103 (i.e., the lens arrangement is not a doublet) such that secondary array of optical elements 102 and primary lens array 103 are operating on light emitted from display 110 in the spatial domain. In the illustrated example, primary lens array 103 is at a distance 123 of about 10-15 mm from array or optical elements 102. Secondary array of optical elements 102 extend elemental images 101a into receiving zones 105a, 105b, 105c, 105d (e.g., target display regions) of each of primary lenslets 103a, 103b, 103c, 103d. Notably, no or very few pixels are wasted in display 110. For example, elemental images 101 may cover substantially of display 110 and be provided within optical path 107 such that optical path 107 includes secondary array of optical elements 102 and primary lens array 103. Elemental images 110, primary lens array 103 and secondary array of optical elements 102 (and any other array of optical elements discussed herein) may include arrays of any numbers such as 20×10 arrays, 20×15 arrays, etc. In an embodiment, secondary array of optical elements 102 (and any other array of optical elements discussed herein) provides for efficient use of the pixel budget of display 110.

In the illustrated example, each of optical elements 102a, 102b, 102c, 102d are a bundle of tapered optical fibers. As illustrated with respect to optical element 102d, each of optical elements 102a, 102b, 102c, 102d may have a dimension such as a width or length, d1, along or on a side 121 thereof that is proximal to display 110 and another dimension such as a width or length, d2, along or on side 122 thereof such that d1 is greater than d2. For example, each of optical elements 102a, 102b, 102c, 102d may have a width (e.g., in the x-dimension) and a length (e.g., in the y-dimension) proximal to display 110 that is greater than the width and length of each of optical elements 102a, 102b, 102c, 102d distal to display 110 to provide concentration of elemental images 101 as discussed herein. Dimensions d1 and d2 may be any suitable values such that d1 is less than d2. In an embodiment, d2 is not more than 70% of d1. In an embodiment, d2 is not more than 50% of d1. However, any suitable dimensions may be implemented.

A bundle of tapered optical fibers of optical elements 102a, 102b, 102c, 102d may include any number and orientation of optical fibers. For example, bundle of tapered optical fibers may include a very dense bundle of optical fibers. An optical fiber is a thin and flexible strand of, for example, glass or plastic, including two different materials with a different refractive indices such that, when light is introduced to the core of the optical fiber, the light is trapped due to total internal reflection. In an imaging context, such as in the context of virtual reality imaging device 100, incoming light into the bundle of optical fibers is from a group of pixels of display 110 (e.g., from elemental images 101a, 101b, 101c, 101d) and the incoming light is transmitted from one end to the other of the bundle of optical fibers thereby concentrating or de-magnifying each of elemental images 101a, 101b, 101c, 101d. Each bundle of tapered optical fibers of optical elements 102a, 102b, 102c, 102d manipulate the incoming light to change its size from display 110 to receiving zones 105a, 105b, 105c, 105d. Notably, by tapering the bundle of optical fibers, the size of elemental images 101a, 101b, 101c, 101d as presented by display 110 is reduced to the size needed by each of primary lenslets 103a, 103b, 103c, 103d of primary lens array 103. One or more of bundle of tapered optical fibers of optical elements 102a, 102b, 102c, 102d may be unique (e.g., having differing dimensions d1, d2, differing heights in the z-dimension, differing numbers of optical fibers, or differing materials). For example, bundle of tapered optical fibers of optical elements 102a, 102b, 102c, 102d may be heterogeneous.

As illustrated, secondary array of optical elements 102 (e.g., tapered optical fiber bundles) are between display 110 and primary lens array 103. In some embodiments, secondary array of optical elements 102 are physically coupled to a surface of display 110. As used herein, the term physically coupled indicates the objects are in physical contact at least at one or more locations or close physical contact at such locations such that are separated only by a joining material such as adhesive film.

Although virtual reality imaging device 100 (and other virtual reality imaging devices) are illustrated with optical elements 102a, 102b, 102c, 102d including only bundles of tapered optical fibers, virtual reality imaging device 100 may include any combination of optical elements such as those discussed herein with respect to virtual reality imaging devices 200, 300, 400. For example, a virtual reality imaging device may include any combination of bundles of tapered optical fibers, plano-concave field lenslets, biconvex lenslets, and plano-convex lenslet. In an embodiment, a virtual reality imaging device includes a combination of bundles of tapered optical fibers and plano-concave field lenslets. In an embodiment, a virtual reality imaging device includes a combination of bundles of tapered optical fibers, plano-concave field lenslets, and plano-convex lenslets. In an embodiment, a virtual reality imaging device includes a combination of bundles of tapered optical fibers plano-convex lenslets. In an embodiment, a virtual reality imaging device includes a combination of plano-concave field lenslets and plano-convex lenslets.

Figure 2:
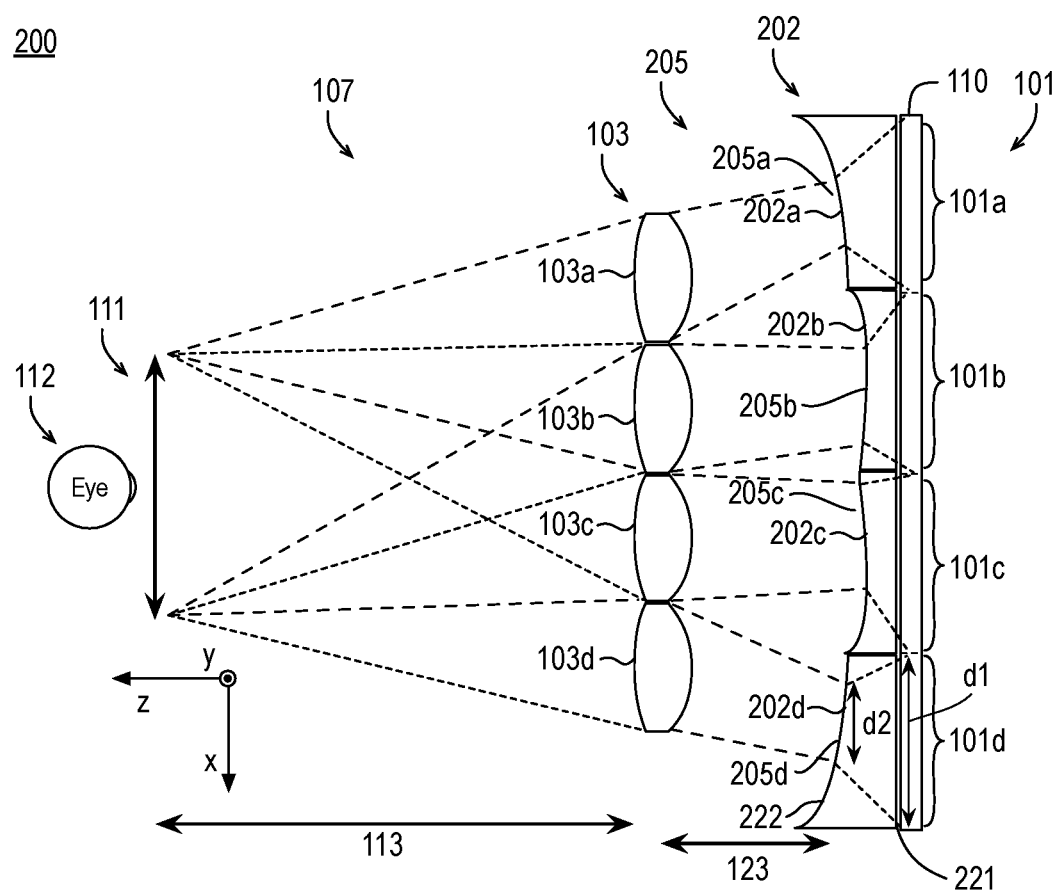
FIG. 2 illustrates another example virtual reality imaging device including an array of plano-concave field lenslets between a display and a primary lens array.

FIG. 2 illustrates another example virtual reality imaging device 200 including an array of plano-concave field lenslets between a display and a primary lens array, arranged in accordance with at least some implementations of the present disclosure. As shown in FIG. 2, virtual reality imaging device 200 includes display 110 to present elemental images 101, a secondary array of optical elements 202, and a primary lens array 103. With respect to FIG. 2 and elsewhere herein, like numerals indicate like components, which may have the same or similar features throughput. Such features or characteristics are not repeated for the sake of clarity of presentation. As illustrated, virtual reality imaging device 200 includes optical path 107 between display 110 and viewing zone 111.

As discussed, each lens of primary lens array 103 provides an elemental image (or at least a portion thereof) of elemental images 101 of display 110 to viewing zone 111 and optical path 107 extends between display 110 and viewing zone 111. As shown in FIG. 2, secondary array of optical elements 202 translates elemental images 101 to receiving zones 205a, 205b, 205c, 205d of lenslets 103a, 103b, 103c, 103d of lens array 103. Notably, absent secondary array of optical elements 202, receiving zones 205a, 205b, 205c, 205d would not be capable of receiving image information from the entirety (or nearly the entirety) of display 110 such that pixels of display 110 would be wasted pixels.

Secondary array of optical elements 202 may include any array of optical elements 202a, 202b, 202c, 202d such that each of optical elements 202a, 202b, 202c, 202d receives a corresponding elemental image 101a, 101b, 101c, 101d of elemental images 101 and concentrates elemental image 101a, 101b, 101c, 101d from display 110 to receiving zone 205a, 205b, 205c, 205d of lenslets 103a, 103b, 103c, 103d. Optical elements 202a, 202b, 202c, 202d concentrate or de-magnify elemental images 101 for use by primary lens array 103. In some embodiments, secondary array of optical elements 202 are heterogeneous optical elements (e.g., heterogeneously designed optical elements). Secondary array of optical elements 202 are between display 110 and primary lens array 103 and in optical path 107. Secondary array of optical elements 202 (e.g., a secondary array with respect to primary lens array 103) are not attached to nor immediately adjacent to primary lens array 103 (i.e., the lens arrangement is not a doublet) such that secondary array of optical elements 102 and primary lens array 103 are operating on light emitted from display 110 in the spatial domain. Secondary array of optical elements 202 extend elemental images 101a into receiving zones 205a, 205b, 205c, 205d (e.g., target display regions) of each of primary lenslets 103a, 103b, 103c, 103d. Notably, no or very few pixels are wasted in display 110. For example, elemental images 101 may cover substantially of display 110 and be provide within optical path 107 such that optical path 107 includes secondary array of optical elements 102 and primary lens array 103.

In the embodiment of FIG. 2, each of optical elements 202a, 202b, 202c, 202d are plano-concave field lenslets. As illustrated with respect to optical element 202d, each of optical elements 202a, 202b, 202c, 202d may have substantially planar side 221 proximal to display 110 and a concave side 222 distal with respect to display 110. In an embodiment, planar side 221 may be advantageous as it may be attached directly (e.g., physically coupled) to display 110 such as being attached to a screen of display 110. In some embodiments, as discussed further herein, the display screen may be curved. In such embodiments, planar side 221 may be attached directly (e.g., physically coupled) to the curved screen while having concave side 222 bends rays to provide elemental images within receiving zones 205a, 205b, 205c, 205d as discussed herein.

Furthermore, as illustrated with respect to optical element 202d, each of optical elements 202a, 202b, 202c, 202d may have a physical dimension such as a width or length, d1, along or on planar side 221 thereof that is proximal to display 110. For example, optical element 202d may capture elemental image 101d across the entirety of dimension d1. On concave side 222 (e.g., a side distal with respect to display 110), optical element 202d may have a physical dimension (e.g., width or length) substantially equal to d1 or smaller than d1 and an optical or image dimension such as a width or length, d2, along or on side 222 such that d1 is greater than d2. For example, each of optical elements 202a, 202b, 202c, 202d may have a physical width (e.g., in the x-dimension) and a physical length (e.g., in the y-dimension) that is greater than an optical or image width and an optical or image length on a concave side of each of optical elements 202a, 202b, 202c, 202d such that the concave side is distal to display 110 to provide concentration of elemental images 101. In some embodiments, optical elements 202a, 202b, 202c, 202d may be characterized as refractive negative field lenslets and secondary array of optical elements 202 may be characterized as a refractive negative field lenslet array. In some embodiments, secondary array of optical elements 202a, 202b, 202c, 202d (e.g., the field lenslets) have a pyramidal shape such that a surface dimension at the concave side (analogous to dimension d1 on concave side 222, not shown) is less than dimension d1 on planar side 221. In some embodiments, the characteristics of each of optical elements 202a, 202b, 202c, 202d (e.g., radius of curvature of concave side 222, freeform coefficients, thickness, and material) may be optimized jointly with primary lens array 103 for improved optical performance. For example, optical elements 202a, 202b, 202c, 202d and lenslets 103a, 103b, 103c, 103d may both be heterogeneous (e.g., differing lenslet by lenslet) such that optimal performance since they are being looked at from different eye viewing angles and spacing. As discussed with respect to FIG. 1, dimensions d1 and d2 may be any suitable values such that d1 is less than d2 such as d2 being not more than 70% of d1, d2 being not more than 50% of d1. However, any suitable dimensions may be implemented.

As discussed, optical elements 202a, 202b, 202c, 202d may be plano-concave field lenslets. Optical elements 202a, 202b, 202c, 202d are between display 110 and primary lens array 103 and within optical path 107. Secondary array of optical elements 202 (e.g., a negative lenslet array including field lenses) are located near an object plane represented by display 110. Each of optical elements 202a, 202b, 202c, 202d steer rays emitted from a corresponding elemental image 101a, 101b, 101c, 101d such the transmitted rays propagate through corresponding or related primary lenslets 103a, 103b, 103c, 103d to viewing zone 111 to be seen by eye 112 via the same viewing angle. For example, optical elements 202a, 202b, 202c, 202d (e.g., field lenslets) pack or concentrate more pixels through same viewing angle seen via primary lens array 103 to increase the delivered pixel per degree (PPD) to eye 112. Notably, more display 110 pixels are mapped using secondary array of optical elements 202 than would be possible in the absence thereof.

Figure 3:
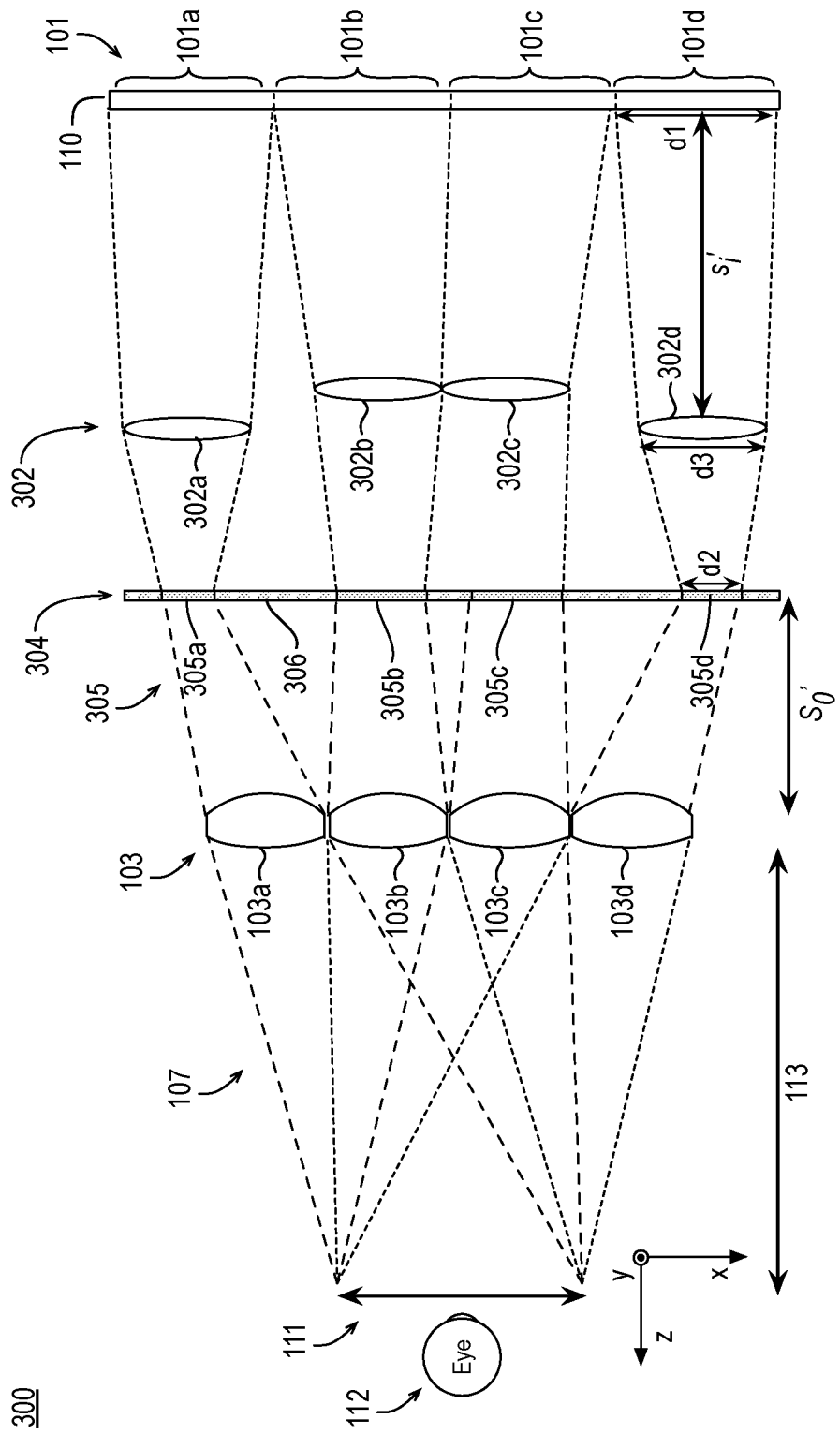
FIG. 3 illustrates an example virtual reality imaging device including an array of bi-convex lenslets between a display and a primary lens array.

FIG. 3 illustrates an example virtual reality imaging device 300 including an array of bi-convex lenslets between a display and a primary lens array, arranged in accordance with at least some implementations of the present disclosure. As shown in FIG. 3, virtual reality imaging device 300 includes display 110 to present elemental images 101, a secondary array of optical elements 302, and a primary lens array 103. As shown, virtual reality imaging device 300 includes optical path 107 between display 110 and viewing zone 111.

Each lens of primary lens array 103 provides an elemental image (or at least a portion thereof) of elemental images 101 of display 110, as received within receiving zones 305a, 305b, 305c, 305d, to viewing zone 111 and optical path 107 extends between display 110 and viewing zone 111. As shown in FIG. 3, secondary array of optical elements 302 translates elemental images 101 to receiving zones 305a, 305b, 305c, 305d of lenslets 103a, 103b, 103c, 103d of lens array 103 such that, absent secondary array of optical elements 302, receiving zones 305a, 305b, 305c, 305d would not be capable of attaining images information from the entirety (or nearly the entirety) of display 110.

Secondary array of optical elements 302 may include any array of optical elements 302a, 302b, 302c, 302d such that each of optical elements 302a, 302b, 302c, 302d receives a corresponding elemental image 101a, 101b, 101c, 101d of elemental images 101 and concentrates elemental image 101a, 101b, 101c, 101d from display 110 to receiving zone 305a, 305b, 305c, 305d of lenslets 103a, 103b, 103c, 103d. Optical elements 302a, 302b, 302c, 302d concentrate or de-magnify elemental images 101 for use by primary lens array 103. In some embodiments, secondary array of optical elements 302 are heterogeneous optical elements (e.g., heterogeneously designed optical elements). Secondary array of optical elements 302 are between display 110 and primary lens array 103 and in optical path 107. Secondary array of optical elements 302 (e.g., a secondary array with respect to primary lens array 103) are not attached to nor immediately adjacent to primary lens array 103 nor are they attached to or immediately adjacent to display 110. Secondary array of optical elements 302 extend elemental images 101a into receiving zones 305a, 305b, 305c, 305d (e.g., target display regions) of each of primary lenslets 103a, 103b, 103c, 103d. In the example of FIG. 3, secondary array of optical elements 302 translates elemental images 101 to an intermediate image plane 304 having portions corresponding to receiving zones 305a, 305b, 305c, 305d and zones 306 that are not within any of receiving zones 305a, 305b, 305c, 305d such that any image information within zones 106 is not translated to viewing zone 111 and, absent secondary array of optical elements 302, zones 106 would be within display 110 with corresponding pixels being wasted.

In the example of FIG. 3, each of optical elements 302a, 302b, 302c, 302d are bi-convex lenses. In some embodiments, optical elements 302a, 302b, 302c, 302d may be housed within a frame at differing distances, $s'_i$, with respect to display 110. Optical elements 302a, 302b, 302c, 302d may be disposed within the frame using any suitable technique or techniques. As illustrated with respect to optical element 302d, each of optical elements 302a, 302b, 302c, 302d may have a dimension such as a width or length, d3, in a direction parallel to or along a surface of display 110. The width or length of each of optical elements 302a, 302b, 302c, 302d may be the same or they may be different (heterogeneous). Furthermore, each of optical elements 302a, 302b, 302c, 302d concentrate or de-magnify corresponding elemental images 101a, 101b, 101c, 101d from display 110 to receiving zones 305a, 305b, 305c, 305d (e.g., at intermediate image plane 304). As shown, each of optical elements 302a, 302b, 302c, 302d may de-magnify elemental images 101a, 101b, 101c, 101d having, as illustrated with respect to elemental image 101d, a dimension such as a width or length, d1, along display 110 to an image at intermediate image plane having a dimension such as a width or length, d2. For example, each of optical elements 302a, 302b, 302c, 302d may concentrate an elemental having a width (e.g., in the x-dimension) and a length (e.g., in the y-dimension) at display 110 to an image within a receiving zone having a width and length that is less than the size at display 110. As discussed herein, dimensions d1 and d2 may be any suitable values such that d1 is less than d2 such as d2 being not more than 70% of d1, d2 being not more than 50% of d1, etc.

In the example of FIG. 3, secondary array of optical elements 302 acts as a relay stage taking elemental images 101 from the image plane of display 110 (e.g., a screen) and concentrating or de-magnifying elemental images 101 to intermediate image plane 304. Such de-magnification may vary between optical elements 302a, 302b, 302c, 302d. For example, optical elements 302a, 302b, 302c, 302d are of positive power and are separated from display 110 by a distance, $s'_i$, (where i indicates a particular optical element) as illustrated with respect to optical element 302a. In some embodiments, distance, $s'_i$, is determined based on a desired magnification, M', and spacing between intermediate image plane 304 and primary lens array 103, $S'_o$, according to the following: $s'_i = M'S'_o$. For example, the distance from an optical element 302a, 302b, 302c, 302d to display 110 may be determined as the product of a desired magnification and a distance from intermediate image plane 304 to primary lens array 103.

Figure 4:
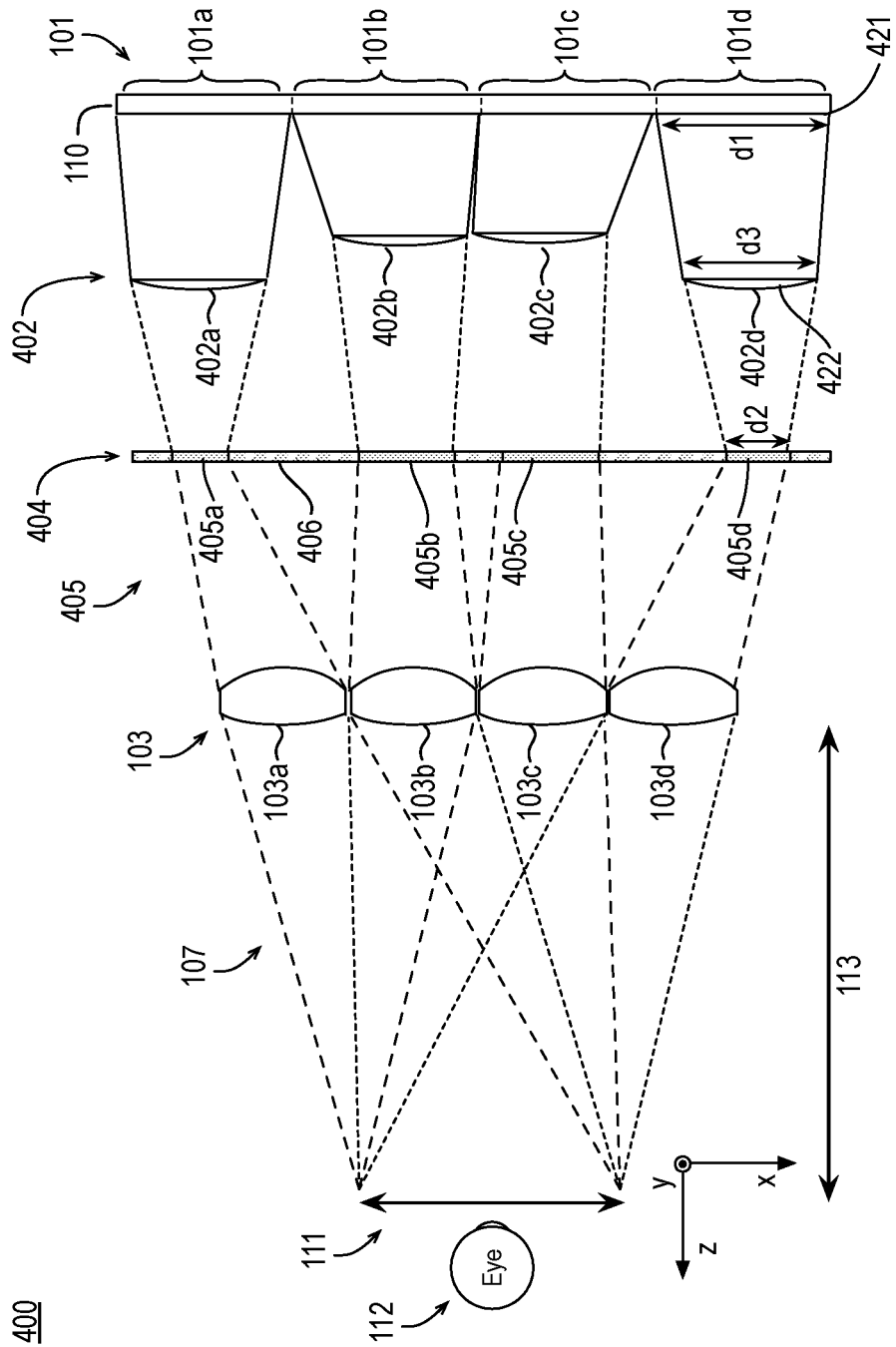
FIG. 4 illustrates an example virtual reality imaging device including an array of plano-convex lenslets between a display and a primary lens array.

FIG. 4 illustrates an example virtual reality imaging device 400 including an array of plano-convex lenslets between a display and a primary lens array, arranged in accordance with at least some implementations of the present disclosure. As shown in FIG. 4, virtual reality imaging device 400 includes display 110 to present elemental images 101, a secondary array of optical elements 402, and a primary lens array 103. As shown, virtual reality imaging device 300 includes optical path 107 between display 110 and viewing zone 111.

As discussed, each lens of primary lens array 103 provides an elemental image (or at least a portion thereof) of elemental images 101 of display 110, as received within receiving zones 405a, 405b, 405c, 405d, to viewing zone 111 and optical path 107 extends between display 110 and viewing zone 111. Secondary array of optical elements 402 translates elemental images 101 to receiving zones 405a, 405b, 405c, 405d of lenslets 103a, 103b, 103c, 103d of lens array 103 such that, absent secondary array of optical elements 302, receiving zones 405a, 405b, 405c, 405d would not be capable of attaining images information from the entirety (or nearly the entirety) of display 110.

Secondary array of optical elements 402 may include any array of optical elements 402a, 402b, 402c, 402d such that each of optical elements 402a, 402b, 402c, 402d receives a corresponding elemental image 101a, 101b, 101c, 101d of elemental images 101 and concentrates elemental image 101a, 101b, 101c, 101d from display 110 to receiving zone 405a, 405b, 405c, 405d of lenslets 103a, 103b, 103c, 103d. Optical elements 402a, 402b, 402c, 402d concentrate or de-magnify elemental images 101 for use by primary lens array 103. In some embodiments, secondary array of optical elements 402 are heterogeneous optical elements (e.g., heterogeneously designed optical elements). Secondary array of optical elements 402 are between display 110 and primary lens array 103 and in optical path 107. Secondary array of optical elements 402 (e.g., a secondary array with respect to primary lens array 103) are not attached to nor immediately adjacent to primary lens array 103. In some embodiments, secondary array of optical elements 402 are physically attached or coupled to a surface of display 110. Secondary array of optical elements 402 extend elemental images 101a into receiving zones 405a, 405b, 405c, 405d (e.g., target display regions) of each of primary lenslets 103a, 103b, 103c, 103d. In the example of FIG. 4, secondary array of optical elements 402 translates elemental images 101 to an intermediate image plane 404 having portions corresponding to receiving zones 405a, 405b, 405c, 405d and zones 406 that are not within any of receiving zones 405a, 405b, 405c, 405d such that any image information within zones 406 is not translated to viewing zone 111 and, absent secondary array of optical elements 402, zones 106 would be within display 110 with corresponding pixels being wasted.

In the example of FIG. 4, each of optical elements 402a, 402b, 402c, 402d are plano-convex lenses or lenslets. As illustrated with respect to optical element 402d, each of optical elements 402a, 402b, 402c, 402d may have substantially planar side 421 proximal to display 110 and a convex side 422 distal with respect to display 110. In an embodiment, planar side 421 may be advantageous as it may be attached directly (e.g., physically coupled) to display 110 such as being attached to a screen of display 110. In some embodiments, as discussed further herein, the display screen may be curved. In such embodiments, planar side 421 may be attached directly (e.g., physically coupled) to the curved screen while having convex side 422 bends rays to provide elemental images within receiving zones 405a, 405b, 405c, 405d as discussed herein.

Furthermore, as illustrated with respect to optical element 402d, each of optical elements 402a, 402b, 402c, 402d may have a physical dimension such as a width or length, d1, along or on planar side 421 thereof that is proximal to display 110. For example, optical element 402d may capture elemental image 101d across the entirety of dimension d1. On concave side 422 (e.g., a side distal with respect to display 110), optical element 402d may have a physical dimension (e.g., width or length), d3, smaller than d1 and an optical or image dimension such as a width or length, d2, along intermediate image plane 404 such that d1 is greater than d2. For example, each of optical elements 402a, 402b, 402c, 402d may have a physical width (e.g., in the x-dimension) and a physical length (e.g., in the y-dimension) at display 110 that is greater than a physical width (e.g., in the x-dimension) distal from display 110, which is, in turn, greater than an optical or image width and an optical or image length of the image at intermediate image plane 404. In some embodiments, the characteristics of each of optical elements 402a, 402b, 402c, 402d (e.g., radius of curvature of convex side 422, freeform coefficients, thickness, and material) may be optimized jointly with primary lens array 103 for improved optical performance. For example, optical elements 402a, 402b, 402c, 402d and lenslets 103a, 103b, 103c, 103d may both be heterogeneous (e.g., differing lenslet by lenslet) such that optimal performance since they are being looked at from different eye viewing angles and spacing. As discussed elsewhere herein, dimensions d1 and d2 may be any suitable values such that d1 is less than d2 such as d2 being not more than 70% of d1, d2 being not more than 50% of d1. However, any suitable dimensions may be implemented.

As discussed, optical elements 402a, 402b, 402c, 402d may be plano-convex lenses or lenslets. Optical elements 402a, 402b, 402c, 402d are between display 110 and primary lens array 103 and within optical path 107. Secondary array of optical elements 402 are located near an object plane represented by display 110. In the example of FIG. 4, secondary array of optical elements 402 acts as a relay stage taking elemental images 101 from the image plane of display 110 (e.g., a screen) and concentrating or de-magnifying elemental images 101 to intermediate image plane 404. Such de-magnification may vary between optical elements 402a, 402b, 402c, 402d. Each of optical elements 402a, 402b, 402c, 402d steer rays emitted from a corresponding elemental image 101a, 101b, 101c, 101d such the transmitted rays propagate through corresponding or related primary lenslets 103a, 103b, 103c, 103d to viewing zone 111 to be seen by eye 112 via the same viewing angle. For example, optical elements 402a, 402b, 402c, 402d pack or concentrate more pixels through same viewing angle seen via primary lens array 103 to increase the delivered pixel per degree (PPD) to eye 112. Notably, more display 110 pixels are mapped using secondary array of optical elements 202 than would be possible in the absence thereof.

As discussed, display 110 may be flat (e.g., planar) or display 110 may be curved. Furthermore, any of virtual reality imaging devices 100, 200, 300, 400 may be implemented via a head mounted display device.

Figure 5:
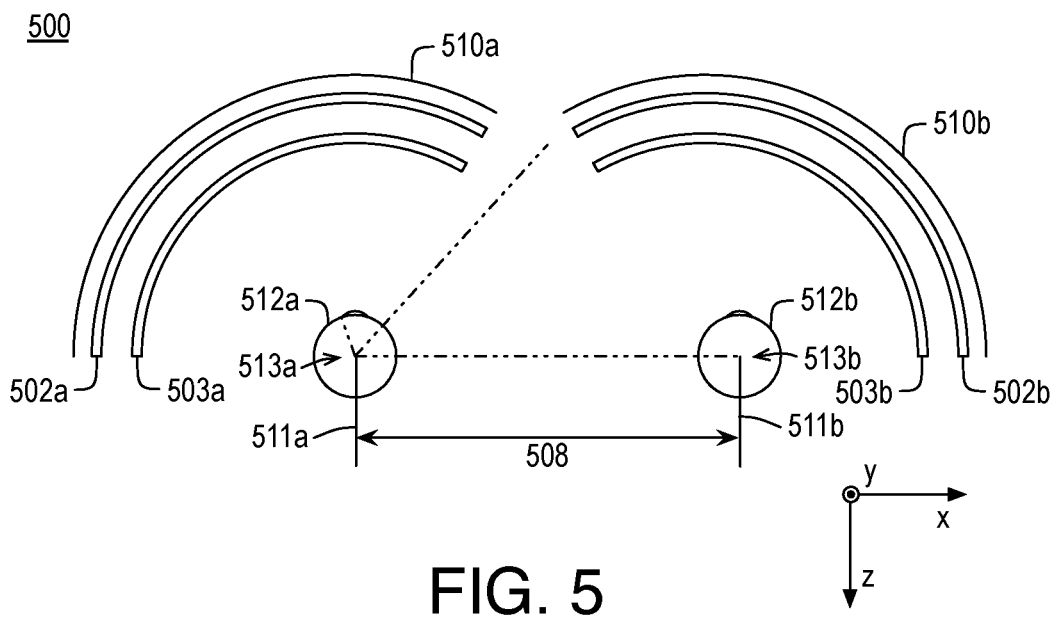
FIG. 5 illustrates an example head mounted display implementing curved displays.

FIG. 5 illustrates an example head mounted display 500 implementing curved displays 510a, 510b, arranged in accordance with at least some implementations of the present disclosure. Head mounted display 500 is illustrated with respect to a left eye 512a and a right eye 512b of a user. As shown in FIG. 5, head mounted display 500 includes separate curved displays or screens 510a, 510b corresponding to left eye 512a and right eye 512b, respectively. Furthermore, head mounted display 500 includes a left side curved primary lens array 503a and a right side curved primary lens array 503b and a left side curved secondary array of optical elements 502a and a right side curved secondary array of optical elements 502b, which also correspond to left eye 512a and right eye 512b, respectively. An inter-pupillary distance (e.g., about 70.61 mm) is indicated by an arrow 508 between pupillary axes 511a, 511b.

Head mounted display 500 presents a pair of virtual reality (VR) images or video to eyes 512a, 512b of a user. For example, the VR images or video can be rendered for presentation on head mounted display 500 as discussed below. As shown, in some embodiments, curved displays 510a, 510b may present an image with a view angle of 180° or more such that high quality images or video may be presented to the periphery of eyes 512a, 512b. Curved displays 510a, 510b may have any components and characteristics discussed herein with respect to display 110. Furthermore, curved primary lens arrays 503a, 503b and curved arrays of optical elements 502a, 502b may have any components and characteristics discussed herein with respect to primary lens array 103 and arrays of optical elements 102, 202, 302, 402.

As discussed, each optical element of curved arrays of optical elements 502a, 502b concentrate or de-magnify elemental images to receiving zones of lenslets of curved primary lens arrays 503a, 503b, which, in turn, magnify the individual elemental images to be projected into eyes 512a, 512b. Thereby, head mounted display 500 provides a smaller focal length than traditional HMDs, a large FOV, and improved off-axis performance. Curved displays 510a, 510b, curved primary lens arrays 503a, 503b, and curved arrays of optical elements 502a, 502b may be curved in any suitable manner. It is noted that the overall structures of curved primary lens arrays 503a, 503b and curved arrays of optical elements 502a, 502b are curved, and not the individual elements thereof. In some embodiments, curved primary lens arrays 503a, 503b and curved arrays of optical elements 502a, 502b are curved cylindrically and horizontally about the y-axis. In some embodiments, curved primary lens arrays 503a, 503b and curved arrays of optical elements 502a, 502b are curved spherically such that curvature is provided both in the horizontal and vertical directions. In an embodiment, for cylindrical curvatures, a user may approximately view all central lenses across the horizontal direction as an on-axis lens. In such embodiments, freeform lens refinements may be used for the vertical dimension for improved sharpness. Although discussed with respect to curved displays, primary lens arrays, and arrays of optical elements, such displays, primary lens arrays, and arrays of optical elements may also be implemented as piecewise approximations of curved structures using planar structures.

In an embodiment, each of curved display 510a, curved primary lens arrays 503a, and curved secondary array of optical elements 502a are arranged concentrically such that each have substantially the same centers of curvature. In an embodiment, each of curved display 510a, curved primary lens arrays 503a, and curved secondary array of optical elements 502 are arranged concentrically such that the center of curvatures are at an eye center 513a of left eye 512a. Similarly, each of curved display 510b, curved primary lens arrays 503b, and curved secondary array of optical elements 502b may be arranged concentrically such that each have substantially the same centers of curvature. In an embodiment, each of curved display 510b, curved primary lens arrays 503b, and curved secondary array of optical elements 502b are arranged concentrically such that the center of curvatures are at an eye center 513b of right eye 512b.

Figure 6:
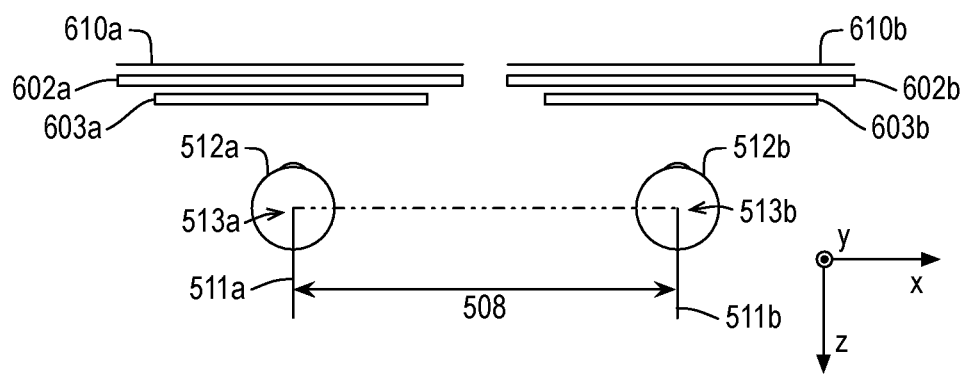
FIG. 6 illustrates an example head mounted display implementing planar displays.

FIG. 6 illustrates an example head mounted display 600 implementing planar displays 610a, 610b, arranged in accordance with at least some implementations of the present disclosure. Head mounted display 600 is illustrated with respect to left eye 512a and right eye 512b of a user having an inter-pupillary distance (e.g., about 70.61 mm) indicated by an arrow 508 between pupillary axes 511a, 511b as discussed with respect to FIG. 5. As shown in FIG. 6, head mounted display 600 includes separate planar displays or screens 610a, 610b corresponding to left eye 512a and right eye 512b, respectively. Furthermore, head mounted display 600 includes a left side planar primary lens array 603a and a right side planar primary lens array 603b and a left side planar secondary array of optical elements 602a and a right side planar secondary array of optical elements 602b, which also correspond to left eye 512a and right eye 512b, respectively. As discussed herein, head mounted display 600 presents a pair of VR images or video to eyes 512a, 512b rendered, as discussed herein. Planar displays 610a, 610b may have any components and characteristics discussed herein with respect to display 110 and planar primary lens arrays 603a, 603b and planar arrays of optical elements 602a, 602b may have any components and characteristics discussed herein with respect to primary lens array 103 and arrays of optical elements 102, 202, 302, 402. Each optical element of planar arrays of optical elements 602a, 602b concentrate or de-magnify elemental images to receiving zones of lenslets of planar primary lens arrays 603a, 603b. Each lenslet of planar primary lens arrays 603a, 603b magnifies the individual elemental images to be projected into eyes 512a, 512b.

Figure 7:
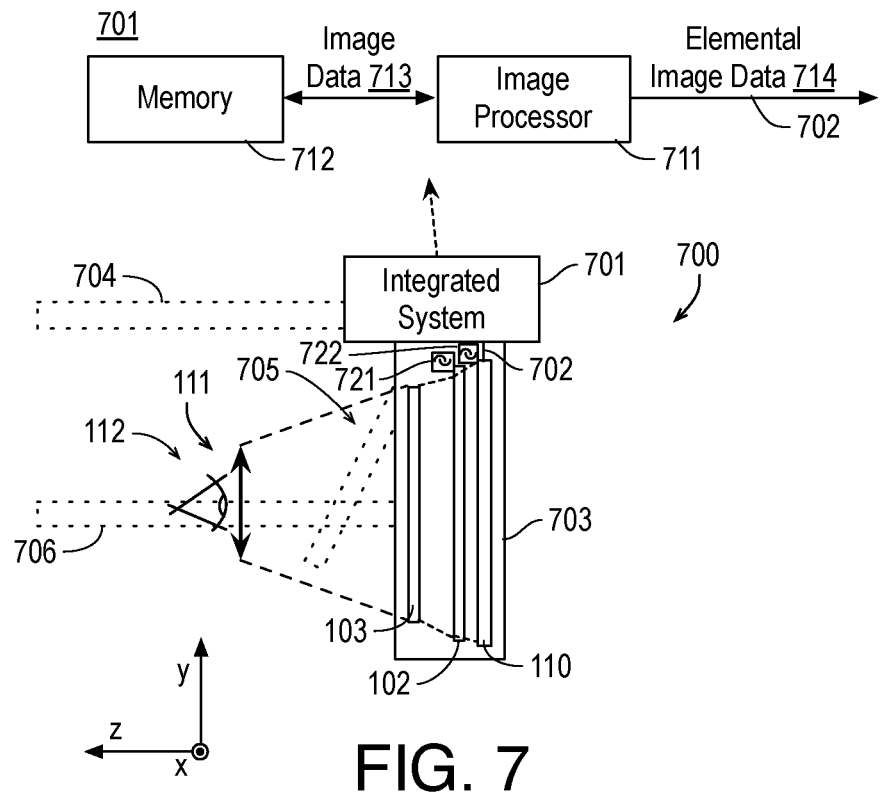
FIG. 7 illustrates an example head mounted display implementing an integrated system to generate elemental images.

FIG. 7 illustrates an example head mounted display 700 implementing an integrated system to generate elemental images, arranged in accordance with at least some implementations of the present disclosure. As shown in the side view FIG. 7, head mounted display 700 includes display 110, secondary array of optical elements 102, and primary lens array 103 within an eyepiece housing 703. Although illustrated with respect to display 110, secondary array of optical elements 102, and primary lens array 103, head mounted display 700 may be implemented using any display, secondary array of optical elements, and primary lens array discussed herein. Furthermore, head mounted display 700 includes a second display, secondary array of optical elements, and primary lens array implemented, for example, in a second eyepiece housing for a second eye of the user, which is obscured in the view of FIG. 7.

As shown in FIG. 7, head mounted display 700 also includes one or more of a nosepiece 705, a strap 704, and an earpiece 706 for wear by a user. Furthermore, head mounted display 700 includes an integrated system 701 to generate elemental image data for transmission to display 110 via communicate coupling 702. For example, integrated system 701 may include a memory 712 (e.g., dynamic, static, magnetic, etc. memory) and a processor such as an image processor 711 and integrated system 701 generates elemental image data 714 based on image data 713 (or 3D model data or the like), which it transmits to display 110 for presentment. Elemental image data 714 may include any suitable image data such as pixel by pixel luma and chroma information (e.g., YUV) or chroma information (e.g., RGB) for use by display 110 at a particular frame or refresh rate. For example, elemental image data 714 may be generated as discussed herein with respect to process 800 and or process 1000.

In the virtual reality imaging device discussed herein, precise alignment of primary lens array 103 and secondary array of optical elements 102 the elemental images (e.g., pixels) of display 110 is vital. Furthermore, it is advantageous that the devices are capable of having the alignment corrected. In an embodiment, head mounted display 700 further includes a manual collimation correction device such as a leveling adjustment or the like. In an embodiment, a worm gear 721 is coupled to housing 703 and display 110 to provide linear displacement of display 110 in either the x- or y-direction and a worm gear 722 is coupled to housing 703 and secondary array of optical elements 102 to provide linear displacement secondary array of optical elements 102 in the other (e.g., y- or x-direction) such that both x- and y-relative motion are provided between display 110 and optical elements 102 to align them. In some embodiments, worm gears 721, 722 or other displacement mechanisms are also provided for primary lens array 103. In some embodiments, such worm gears or other displacement mechanisms are used during manufacture to align elements, the elements are secured into place (e.g., using adhesives), and the mechanisms are removed.

For example, with reference to FIGS. 1, 2, and 4, in some embodiments, secondary array of optical elements 102, 202, 402 may be in physical contact with display 110, which makes z-alignment constant and x- and y-alignment may be achieved using worm gears 721, 722 or other displacement mechanisms. With reference to FIG. 3, secondary array of optical elements 302 may includes optical elements 302a, 302b, 302c, 302d (e.g., biconvex lenslets) that may have differing z-dimension offsets with respect to display 110. In an embodiment, each of optical elements 302a, 302b, 302c, 302d may be aligned and fixed within housing 703. In an embodiment, each of optical elements 302a, 302b, 302c, 302d are implemented via a substrate that fills gaps between each of optical elements 302a, 302b, 302c, 302d and creates a single cohesive volume element. For example, the substrate may include plateaus of different heights for each of optical elements 302a, 302b, 302c, 302d, which may be secured (e.g., via adhesive) to the substrate. The single volume may then be aligned in the x- and y-dimensions using worm gears 721, 722 or other displacement mechanisms as discussed above.

Figure 8:
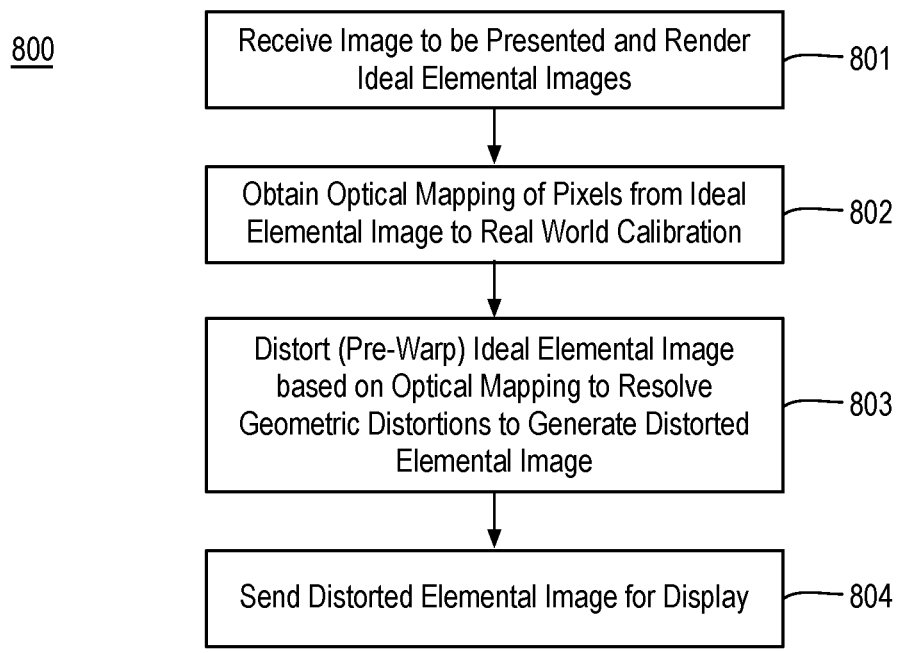
FIG. 8 illustrates an example process for correcting distortions in virtual reality imaging devices.

FIG. 8 illustrates an example process 800 for correcting distortions in virtual reality imaging devices, arranged in accordance with at least some implementations of the present disclosure. Process 800 may include one or more operations 801-804 as illustrated in FIG. 8. Process 800 or portions thereof may be performed by any device or system discussed herein to generate elemental images or elemental image data for presentment to a user. Process 800 or portions thereof may be repeated for any number of sets of elemental images, or the like. For example, the implementation of the optical elements (e.g., primary lens array and secondary array of optical elements) discussed herein, may produce aberrations such as geometric distortions. Process 800 may be used to implement such aberrations.

Process 800 begins at operation 801, where an image to be presented to a user may be received or generated. The image to be presented may be in any suitable data format and may represent, for example, a 3D scene to be presented at a virtual distance from the eyes of a user. For example, the image to be presented may be a data structure of a 3D model to be presented via VR to a user at the virtual distance (e.g., a distance from an eye center of a user to a virtual surface). Based on the image to be presented, a stereo view of the image is rendered (e.g., via processor 711) for each eye based on the virtual distance to a virtual surface (e.g., a plane). For example, operation 801 may include rendering an ideal elemental image based on an image (a virtual image for a virtual scene) to be presented to a user.

Figure 9:
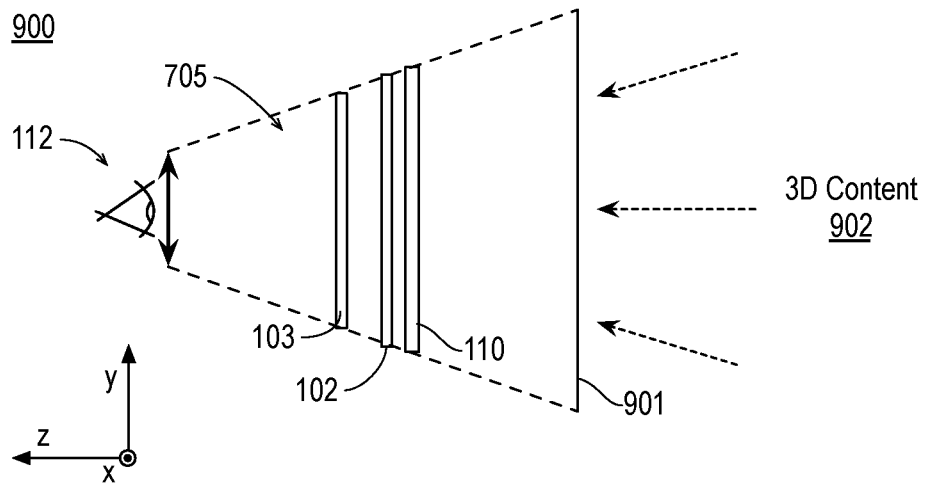
FIG. 9 illustrates an example virtual reality environment.

FIG. 9 illustrates an example virtual reality environment 900, arranged in accordance with at least some implementations of the present disclosure. As shown in FIG. 9, 3D content 902 (as represented by the image to be presented, for example) is virtually presented to a user by displaying elemental images via display 110, primary lens array 103, and secondary array of optical elements 102 (or any other such components discussed herein) by rendering 3D content 902 onto virtual surface 901. For example, the virtual surface 901 may emulate a virtual plane in a stereo head mounted display.

Returning to FIG. 8, as discussed, a stereo view of the image to be presented is rendered for each eye at, for example, a virtual surface located at the virtual distance. In some embodiments, the virtual surface is a plane. In some embodiments, the virtual surface is a plane of an emulation of a traditional stereo HMD with 2 flat screen planes located at a given virtual distance from eyes of a user. In some embodiments, the virtual surface may be a cylindrical surface or a piecewise linear approximation of a cylindrical surface. The stereo view includes elemental images (e.g., rectangular images) for presentment. In some embodiments, the elemental images rendered at operation 801 may be characterized as ideal elemental images as such elemental images do not take into account any geometric distortions that may be present in the virtual reality imaging device that will display them. For example, such rendering may assume an ideal or perfect virtual reality imaging device optics that are distortion free.

Processing continues at operation 802, where an optical mapping of pixels from ideal elemental images to a real world calibration of a virtual reality imaging device is obtained. The optical mapping is based on an optical path between a display to present the elemental images and a viewing zone of the user such as optical path 107 discussed herein. In some embodiments, the optical mapping may be characterized as a geometric distortion correction mapping. Optical path 107, as discussed, includes primary lens array 103 between a display (e.g., any of displays 110, 510a, 510b, 610a, 610b, etc.) and the user, such that each lens or lenslet of primary lens array 103 is to magnify a displayed elemental image within a receiving zone of the lens or lenslet to the viewing zone, and a secondary array of optical elements (e.g., any secondary array of optical elements discussed herein) between the display and primary lens array 103, such that each optical element of the secondary array of optical elements is to concentrate a particular elemental image from the display to the receiving zone of a corresponding lens of the primary lens array.

The optical mapping may be generated using any suitable technique or techniques. In an embodiment, the optical mapping is generated based on a display to virtual image optical mapping using a simulated model of the optical path (e.g., based on the optics in the optical path) such as ray tracing techniques. For example, the optical mapping may be a pixel-to-pixel mapping between an ideal elemental image and a pre-distorted elemental image to resolve geometric distortions of a given virtual reality imaging device. In an embodiment, calibration equipment (e.g., camera-based) is used (either for each virtual reality imaging device or using a sampling of such virtual reality imaging devices) to generate the optical mapping. For example, resultant images may be compared to ideal images and the difference may be mapped in the optical mapping. In an embodiment, pixels for each of the stereo views from the virtual surface to elemental images are mapped for a per-eye display using a per-lens projection model. In some embodiments, the per-lens projection model may include a perspective projection of a virtual image with a center of projection assigned to a particular individual lens.

In an embodiment, the optical mapping is generated based on a numerical simulation performed using ray tracing through the optics model representing the optical path. For example, the simulation may provide an ideal-to-actual pixel mapping assuming ideal optics (e.g., no manufacturing tolerances). Then, a calibration using a camera or array of cameras on a translation stage may determine calibration patterns and estimate adjustments to the simulation data. In some embodiments, the final calibration data is compressed using a parametric model fitting. In an embodiment, obtaining the optical mapping includes accessing, via memory, parametric model parameters.

Processing continues at operation 803, where the ideal elemental images rendered at operation 801 are distorted or pre-warped based on the optical model obtained at operation 802 to generate distorted elemental images or image data representing the distorted elemental images such that the geometric distortions are resolved. In some embodiments, a parametric model representative of a ray tracing is applied to an ideal elemental image to generate the distorted elemental image. In an embodiment, the optical mapping is a parametric model and distorting the ideal elemental image to the distorted elemental image includes attaining coefficients of the parametric model and applying the parametric model to the ideal elemental image. In an embodiment, the optical mapping is a per-pixel mapping and distorting the ideal elemental image to the distorted elemental image includes accessing a look up table (LUT) on a per pixel basis and applying distortion by applying the offset accessed in the LUT. As will be appreciated, when the distorted elemental image is displayed to a user, the resultant imaging will be closer to the ideal image due to the pre-distortion or warping. For example, operation 803 may include distorting the ideal elemental image generated at operation 801 to pre-distorted elemental image using the optical mapping obtained at operation 802 such that the optical mapping is based on an optical path between a display and a viewing zone of the user with the optical path including a primary lens array between the display and the user, and a secondary array of optical elements between the display and the primary lens array.

Processing continues at operation 804, where the distorted elemental images or image data representing the distorted elemental images is transferred or sent to a display of a virtual reality imaging device for presentment to a user. For example, operation 804 may include transmitting the elemental image generated at operation 803 for presentment via the display.

Figure 10:
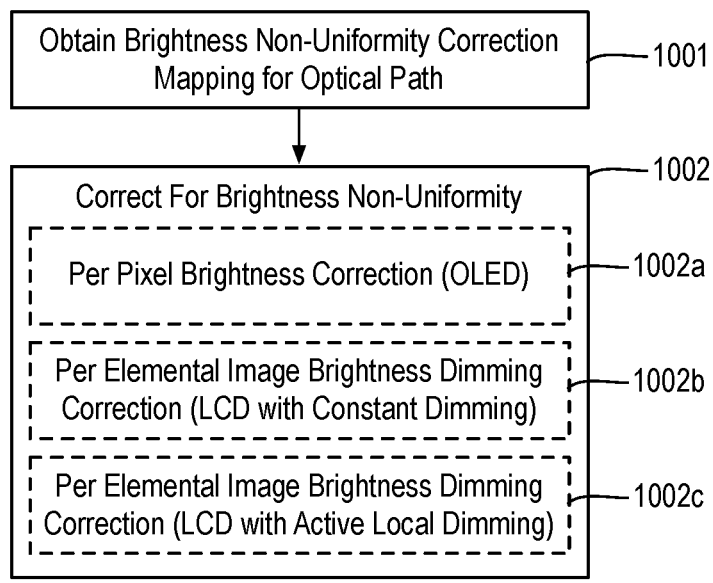
FIG. 10 illustrates an example process for correcting brightness non-uniformity in virtual reality imaging devices.

FIG. 10 illustrates an example process 1000 for correcting brightness non-uniformity in virtual reality imaging devices, arranged in accordance with at least some implementations of the present disclosure. Process 1000 may include one or more operations 1001 and 1002 as illustrated in FIG. 10. Process 1000 or portions thereof may be performed by any device or system discussed herein. For example, the implementation of the optical elements (e.g., primary lens array and secondary array of optical elements) discussed herein, may produce aberrations such as brightness non-uniformity that may be mitigated or resolved using process 1000. For example, heterogeneous emission profiles of arrays of optical elements (e.g., fiber bundles or lenses) may cause difficulties in brightness uniformity may be mitigated or resolved using process 1000 and structures discussed herein.

Process 1000 begins at operation 1001, where a brightness non-uniformity correction mapping for the optical path of the virtual reality imaging device is obtained. The non-uniformity correction mapping is based on an optical path between a display to present the elemental images and a viewing zone of the user such that the optical path includes a primary lens array between a display and the user, such that each lens or lenslet of primary lens array is to magnify a displayed elemental image within a receiving zone of the lens or lenslet to the viewing zone, and a secondary array of optical elements (e.g., any secondary array of optical elements discussed herein) between the display and the primary lens array such that each optical element of the secondary array of optical elements is to concentrate a particular elemental image from the display to the receiving zone of a corresponding lens of the primary lens array. The brightness non-uniformity correction mapping may be generated using any suitable technique or techniques such as transmission modeling techniques, calibration techniques (e.g., camera-based or brightness-detection based), etc. In an embodiment, the brightness non-uniformity correction mapping is static such that it does not change with respect to elemental images for display. In some embodiments, the brightness non-uniformity correction mapping may be characterized as a transmission model.

Process continues at operation 1002, where correction is made for the brightness non-uniformity using one or more of sub-operations 1002a, 1002b, 1002c. In an embodiment, operation 1002 includes per pixel brightness correction as illustrated with respect to sub-operation 1002a. In particular, per pixel brightness correction may be utilized in implementations where a display of the virtual reality imaging device is an OLED display or other display that provide for per pixel brightness capabilities. In an embodiment, correcting for brightness non-uniformity includes adjusting per-pixel brightness of an elemental image prior to it being sent for display. For example, some elemental images (or portions thereof) may be brightened or dimmed to compensate for brightness non-uniformity of a virtual reality imaging device. In an embodiment, per-pixel brightness of an elemental image generated at operation 801 or 803 as discussed with respect to process 800 is adjusted, prior to transmission thereof for presentment. In an embodiment, the per-pixel brightness adjustment is the same across an elemental image. For example, the brightness may be uniformly increased (e.g., by addition of an offset or multiplication by a factor) or decreased (e.g., by subtraction of an offset or division by a factor). In an embodiment, the adjustment is made based on the transmission model obtained at operation 1001.

In an embodiment, operation 1002 includes per elemental image brightness dimming using a constant dimming pattern as illustrated with respect to sub-operation 1002b. In particular, per elemental image brightness dimming may be utilized in implementations where a display of the virtual reality imaging device is an LCD display or other display having a backlight that does not provide for per pixel brightness capabilities. In an embodiment, correcting for brightness non-uniformity includes providing a static or constant dimming array that is pre-printed to compensate for brightness non-uniformity.

Figure 11:
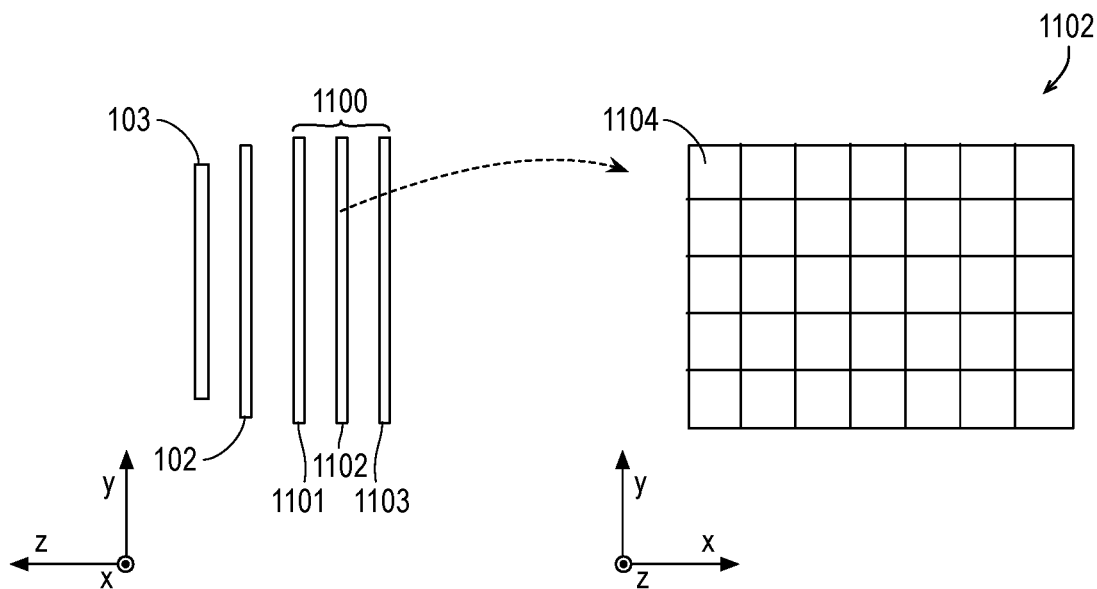
FIG. 11 illustrates an example dimming array implemented via example display.

FIG. 11 illustrates an example dimming array 1102 implemented via example display 1100, arranged in accordance with at least some implementations of the present disclosure. As shown in FIG. 11, display 1100 may include a backlight 1103 and a screen 1101, and dimming array 1102 between backlight 1103 and screen 1101. In an embodiment, dimming array 1102 is instead between secondary array of optical elements 102 and screen 1101. As shown, dimming array 1102 includes any number of dimming regions 1104 that may each provide a different dimming factor. As used herein, a dimming factor is a reduction in light transmission or brightness by a particular amount such as 5% reduction, 10% reduction, etc. In an embodiment, dimming array 1102 comprises a film with a constant dimming pattern (e.g., a particular dimming factor for each of dimming regions 1104). For example, dimming array 1102 may be a translucent film having different thicknesses or properties in each of dimming regions 1104. As discussed, correction for the brightness non-uniformity may require only static correction such that dimming array 1102 may be pre-printed.

Returning to FIG. 10, in an embodiment, operation 1002 includes per elemental image brightness dimming using a dynamic dimming pattern as illustrated with respect to sub-operation 1002c. In particular, per elemental image brightness dimming may be utilized in implementations where a display of the virtual reality imaging device is an LCD display or other display having a backlight that does not provide for per pixel brightness capabilities while the display includes a dynamic brightness dimming capability. In an embodiment, correcting for brightness non-uniformity includes generating, based on the optical path (e.g., based on the brightness non-uniformity correction mapping), per elemental image brightness data comprising a brightness value for each of the elemental images. For example, the elemental images may be generated at operation 801 or 803 as discussed herein. The brightness value for each of the elemental images may be transmitted to a display having a dynamic dimming pattern and the dynamic dimming pattern may implement the brightness values (e.g., by dynamically dimming some regions corresponding to elemental images) during presentment of the elemental images.

For example, returning to FIG. 11, dimming array 1102 may be a dynamic or an active dimming array such that each of dimming regions 1104 may be dynamically dimmed to implement brightness (or dimness) values for each corresponding elemental image. That is, each of dimming regions 1104 may be programmable to vary the brightness reduction of the dimming regions 1104. The brightness (or dimness)

values may include any suitable values such as desired brightness for the elemental image (e.g., average brightness), a desired dimming factor for each elemental image, etc. such that the discussed brightness non-uniformity correction mapping may be implemented.

Returning to FIG. 10, operation 1002 may thereby include any combination of sub-operations 1002a, 11002b, 1002c to correct for brightness non-uniformity either statically (e.g., using a pre-printed dimming pattern) or dynamically (e.g., using per-pixel brightness correction via a display screen and/or per-elemental image correction via a programmable dimming pattern) or both.

Figure 12:
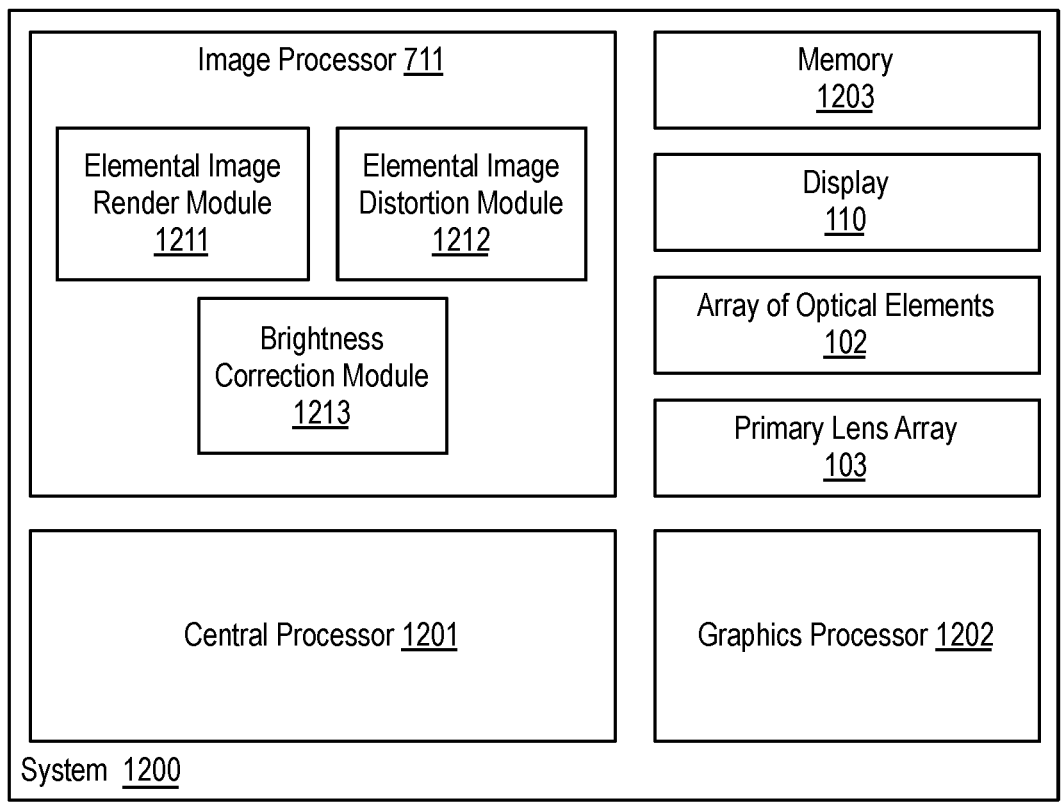
FIG. 12 is an illustrative diagram of an example system for displaying stereo images.

FIG. 12 is an illustrative diagram of an example system 1200 for displaying stereo images, arranged in accordance with at least some implementations of the present disclosure. As shown in FIG. 12, system 1200 may include a central processor 1201, a graphics processor 1202, a memory 1203, image processor 711, display 110 (or any other display discussed herein), secondary array of optical elements 102 (e.g., any secondary array of optical elements discussed herein), and primary lens array 103. As discussed, secondary array of optical elements 102 and primary lens array 103 may be part of an optical path between display 110 and a user. Also as shown, image processor 711 may include or implement an elemental image render module 1211, an elemental image distortion module 1212, and a brightness correction module 1213. For example, system 1200 may implement any components discussed herein and may perform any operations discussed herein.

For example, elemental image render module 1211 may implement operation 801 discussed herein and/or other elemental image render operations, elemental image distortion module 1212 may implement operation 803 and/or other elemental image pre-warp or distortion operations, and brightness correction module 1213 may generate data or manipulate images to implement operations 1002a, 1002c or other brightness non-uniformity correction operations. In the example of system 1200, memory 1203 may store elemental image data, render data, optical mapping data (e.g., model coefficients), brightness correction data, brightness non-uniformity correction model data, and/or any other data as discussed herein.

As shown, in some embodiments, elemental image render module 1211, an elemental image distortion module 1212, and a brightness correction module 1213 are implemented by image processor 711. In some embodiments, one some or all of elemental image render module 1211, elemental image distortion module 1212, and brightness correction module 1213 are implemented by central processor 1201. In some embodiments, one some or all of elemental image render module 1211, elemental image distortion module 1212, and brightness correction module 1213 are implemented by graphics processor 1202.

Image processor 711 may include any number and type of image processing units that may provide the discussed elemental image render, elemental image distortion, and brightness non-uniformity correction operations as discussed herein. For example, image processor 711 may include circuitry dedicated to manipulate image data obtained from memory 1203. For example, image processor 711 may include any number and type of image signal or image processing units that may provide the discussed operations. For example, image processor 711 may include circuitry dedicated to manipulate image data such as an ASIC or the like. Graphics processor 1122 may include any number and type of graphics processing units that may provide the operations discussed herein. For example, graphics processor 1202 may include circuitry dedicated to manipulate 3D model data to generate image data. Central processor 1201 may include any number and type of processing units or modules that may provide control and other high level functions for system 1200 and/or provide the discussed virtual reality image presentment operations discussed herein. Memory 1203 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1203 may be implemented by cache memory.

In an embodiment, one or more or portions of elemental image render module 1211, elemental image distortion module 1212, and brightness correction module 1213 may be implemented via an execution unit (EU) of image processor 711 or graphics processor 1202. The EU may include, for example, programmable logic or circuitry such as a logic core or cores that may provide a wide array of programmable logic functions. In an embodiment, one or more or portions of elemental image render module 1211, elemental image distortion module 1212, and brightness correction module 1213 may be implemented via dedicated hardware such as fixed function circuitry or the like of image processor 711 or graphics processor 1202. Fixed function circuitry may include dedicated logic or circuitry and may provide a set of fixed function entry points that may map to the dedicated logic for a fixed purpose or function.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 13:
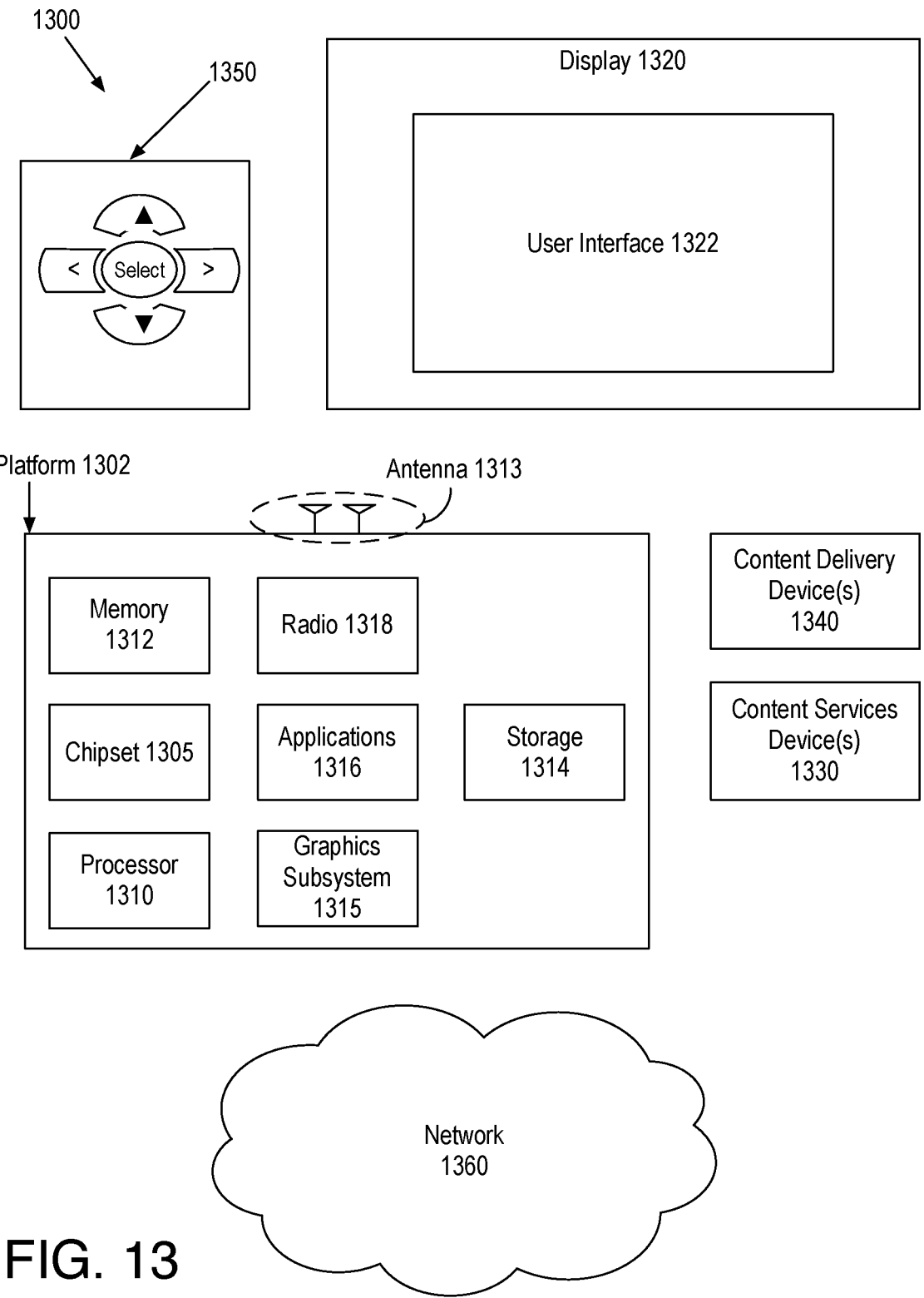
FIG. 13 is an illustrative diagram of an example system, all arranged in accordance with at least some implementations of the present disclosure.

FIG. 13 is an illustrative diagram of an example system 1300, arranged in accordance with at least some implementations of the present disclosure. For example, system 1300 may include or implement any components, techniques, devices or systems discussed herein. In various implementations, system 1300 may be a mobile system such as an HMD although system 1300 is not limited to this context. System 1300 may implement and/or perform any modules or techniques discussed herein. For example, system 1300 may be incorporated into a personal computer (PC), sever, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1300 may be implemented via a cloud computing environment.

In various implementations, system 1300 includes a platform 1302 coupled to a display 1320. Platform 1302 may receive content from a content device such as content services device(s) 1330 or content delivery device(s) 1340 or other similar content sources. A navigation controller 1350 including one or more navigation features may be used to interact with, for example, platform 1302 and/or display 1320. Each of these components is described in greater detail below.

In various implementations, platform 1302 may include any combination of a chipset 1305, processor 1310, memory 1312, antenna 1313, storage 1314, graphics subsystem 1315, applications 1316 and/or radio 1318. Chipset 1305 may provide intercommunication among processor 1310, memory 1312, storage 1314, graphics subsystem 1315, applications 1316 and/or radio 1318. For example, chipset 1305 may include a storage adapter (not depicted) capable of providing intercommunication with storage 1314.

Processor 1310 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1310 may be dual-core processor(s), dual-core mobile processor(s), and so forth.

Memory 1312 may be implemented as a volatile memory device such as, but not limited to, a Random Access Memory (RAM), Dynamic Random Access Memory (DRAM), or Static RAM (SRAM).

Storage 1314 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1314 may include technology to increase the storage performance enhanced protection for valuable digital media when multiple hard drives are included, for example.

Graphics subsystem 1315 may perform processing of images such as still or video for display. Graphics subsystem 1315 may be a graphics processing unit (GPU) or a visual processing unit (VPU), for example. An analog or digital interface may be used to communicatively couple graphics subsystem 1315 and display 1320. For example, the interface may be any of a High-Definition Multimedia Interface, DisplayPort, wireless HDMI, and/or wireless HD compliant techniques. Graphics subsystem 1315 may be integrated into processor 1310 or chipset 1305. In some implementations, graphics subsystem 1315 may be a stand-alone device communicatively coupled to chipset 1305.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1318 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1318 may operate in accordance with one or more applicable standards in any version.

In various implementations, display 1320 may include any television type monitor or display. Display 1320 may include, for example, a computer display screen, touch screen display, video monitor, television-like device, and/or a television. Display 1320 may be digital and/or analog. In various implementations, display 1320 may be a holographic display. Also, display 1320 may be a transparent surface that may receive a visual projection. Such projections may convey various forms of information, images, and/or objects. For example, such projections may be a visual overlay for a mobile augmented reality (MAR) application. Under the control of one or more software applications 1316, platform 1302 may display user interface 1322 on display 1320.

In various implementations, content services device(s) 1330 may be hosted by any national, international and/or independent service and thus accessible to platform 1302 via the Internet, for example. Content services device(s) 1330 may be coupled to platform 1302 and/or to display 1320. Platform 1302 and/or content services device(s) 1330 may be coupled to a network 1360 to communicate (e.g., send and/or receive) media information to and from network 1360. Content delivery device(s) 1340 also may be coupled to platform 1302 and/or to display 1320.

In various implementations, content services device(s) 1330 may include a cable television box, personal computer, network, telephone, Internet enabled devices or appliance capable of delivering digital information and/or content, and any other similar device capable of uni-directionally or bi-directionally communicating content between content providers and platform 1302 and/or display 1320, via network 1360 or directly. It will be appreciated that the content may be communicated uni-directionally and/or bi-directionally to and from any one of the components in system 1300 and a content provider via network 1360. Examples of content may include any media information including, for example, video, music, medical and gaming information, and so forth.

Content services device(s) 1330 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1302 may receive control signals from navigation controller 1350 having one or more navigation features. The navigation features of navigation controller 1350 may be used to interact with user interface 1322, for example. In various embodiments, navigation controller 1350 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1350 may be replicated on a display (e.g., display 1320) by movements of a pointer, cursor, focus ring, or other visual indicators displayed on the display. For example, under the control of software applications 1316, the navigation features located on navigation controller 1350 may be mapped to virtual navigation features displayed on user interface 1322, for example. In various embodiments, navigation controller 1350 may not be a separate component but may be integrated into platform 1302 and/or display 1320. The present disclosure, however, is not limited to the elements or in the context shown or described herein.

In various implementations, drivers (not shown) may include technology to enable users to instantly turn on and off platform 1302 like a television with the touch of a button after initial boot-up, when enabled, for example. Program logic may allow platform 1302 to stream content to media adaptors or other content services device(s) 1330 or content delivery device(s) 1340 even when the platform is turned "off." In addition, chipset 1305 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1300 may be integrated. For example, platform 1302 and content services device(s) 1330 may be integrated, or platform 1302 and content delivery device(s) 1340 may be integrated, or platform 1302, content services device(s) 1330, and content delivery device(s) 1340 may be integrated, for example. In various embodiments, platform 1302 and display 1320 may be an integrated unit. Display 1320 and content service device(s) 1330 may be integrated, or display 1320 and content delivery device(s) 1340 may be integrated, for example. These examples are not meant to limit the present disclosure.

In various embodiments, system 1300 may be implemented as a wireless system, a wired system, or a combination of both. When implemented as a wireless system, system 1300 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1300 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1302 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 13.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

What is claimed is:

1. An apparatus for displaying stereo images comprising:
a display to present a plurality of elemental images, each of the elemental images comprising a group of pixels representative of a corresponding elemental image and on a separate imaging region of the display;
a primary lens array in an optical path between the display and a viewing zone of a user, each primary lens of the primary lens array to magnify an entirety of only one corresponding elemental image within a corresponding receiving zone of each primary lens to the viewing zone of the user;
a secondary lens array of bi-convex lenses in the optical path and between the display and the primary lens array, each bi-convex lens of the secondary lens array of bi-convex lenses to concentrate an entirety of only one corresponding elemental image from a corresponding imaging region of the display to the receiving zone of a corresponding primary lens of the primary lens array, the secondary lens array of bi-convex lenses comprising a first bi-convex lens at a first distance from a corresponding first imaging region of the display to concentrate a corresponding first elemental image to an intermediate image plane comprising the receiving zone of each primary lens and a second bi-convex lens at a second distance from a corresponding second imaging region of the display to concentrate a corresponding second elemental image to the intermediate image plane, wherein the intermediate image plane comprises the receiving zone of each primary lens and a zone not within any receiving zone of the primary lens array.

2. The apparatus of claim 1, wherein the first distance is a product of a third distance between the intermediate image plane from the primary lens array and a first demagnification to concentrate the first elemental image to a corresponding first receiving zone of a corresponding first primary lens of the primary lens array and the second distance is a product of the third distance and a second demagnification to concentrate the second elemental image to a corresponding second receiving zone of a corresponding second primary lens of the primary lens array.

3. The apparatus of claim 1, wherein the receiving zones of the primary lens array at the intermediate image plane, taken together, correspond to an entirety of the imaging regions of the display.

4. The apparatus of claim 1, wherein the secondary lens array of bi-convex lenses comprises heterogeneous bi-convex lenses.

5. The apparatus of claim 1, wherein the secondary lens array of bi-convex lenses are provided with the first bi-convex lens at the first distance from the corresponding first imaging region and the second bi-convex lens at the second distance from the corresponding second imaging region within a housing.

6. The apparatus of claim 1, wherein the display comprises a curved display, the secondary lens array of bi-convex lenses comprise a curved secondary array, and the curved display and the curved secondary array have substantially the same centers of curvature.

7. The apparatus of claim 6, wherein the primary lens array comprises a curved primary lens array having substantially the same center of curvature as the curved display and the curved secondary array.

8. The apparatus of claim 1, wherein the display comprises a screen and a dimming array adjacent to the screen, the dimming array to provide a particular dimming factor for each of the elemental images.

9. An apparatus for displaying stereo images comprising:
a display to present a plurality of elemental images, each of the elemental images comprising a group of pixels representative of a corresponding elemental image and on a separate imaging region of the display;
a primary lens array in an optical path between the display and a viewing zone of a user, each primary lens of the primary lens array to magnify an entirety of only one corresponding elemental image within a corresponding receiving zone of each primary lens to the viewing zone of the user;
a secondary array of plano-convex lenses in the optical path and coupled to the display, each plano-convex lens of the secondary array of plano-convex lenses to concentrate an entirety of only one corresponding elemental image from a corresponding imaging region of the display to the receiving zone of a corresponding primary lens of the primary lens array, the secondary array of plano-convex lenses comprising a first plano-convex lens having a first lens characteristic to concentrate a corresponding first elemental image to an intermediate image plane comprising the receiving zone of each primary lens and a second plano-convex lens having a second lens characteristic to concentrate a corresponding second elemental image to the intermediate image plane, wherein the intermediate image plane comprises the receiving zone of each primary lens and a zone not within any receiving zone of the primary lens array.

10. The apparatus of claim 9, wherein the first and second lens characteristics comprises one of radiuses of curvature opposite the display, lens freeform coefficients, lens thicknesses, or lens materials.

11. The apparatus of claim 9, wherein the first and second lens characteristics comprise lens thicknesses.

12. The apparatus of claim 9, wherein the receiving zones of the primary lens array at the intermediate image plane, taken together, correspond to an entirety of the imaging regions of the display.

13. The apparatus of claim 9, wherein the zone not within any receiving zone of the primary lens array does not correspond to any portion of any imaging region of the display.

14. The apparatus of claim 9, wherein the display comprises a curved display, the secondary lens array of bi-convex lenses comprise a curved secondary array, and the curved display and the curved secondary array have substantially the same centers of curvature.

15. The apparatus of claim 14, wherein the primary lens array comprises a curved primary lens array having substantially the same center of curvature as the curved display and the curved secondary array.

16. The apparatus of claim 9, wherein the display comprises a screen and a dimming array adjacent to the screen, the dimming array to provide a particular dimming factor for each of the elemental images.

17. At least one non-transitory machine readable medium comprising a plurality of instructions that, in response to being executed on a device, cause the device to display stereo images by:

rendering an ideal elemental image based on an image to be presented to a user;

distorting the ideal elemental image to a second elemental image using an optical mapping based on an optical path between a display and a viewing zone of the user, the display to present a plurality of elemental images, each of the elemental images comprising a group of pixels representative of a corresponding elemental image and on a separate imaging region of the display, and the optical path comprising a primary lens array between the display and the user, each primary lens of the primary lens array to magnify an entirety of only one corresponding displayed elemental image within a corresponding receiving zone of each primary lens to the viewing zone, and a secondary array of plano-convex lenses in the optical path and coupled to the display, each plano-convex lens of the secondary array of plano-convex lenses to concentrate an entirety of only one corresponding elemental image from a corresponding imaging region of the display to the receiving zone of a corresponding primary lens of the primary lens array, the secondary array of plano-convex lenses comprising a first plano-convex lens having a first lens characteristic to concentrate a corresponding first elemental image to an intermediate image plane comprising the receiving zone of each primary lens and a second plano-convex lens having a second lens characteristic to concentrate a corresponding second elemental image to the intermediate image plane, wherein the intermediate image plane comprises the receiving zone of each primary lens and a zone not within any receiving zone of the primary lens array; and transmitting the second elemental image for presentment via the display.

18. The non-transitory machine readable medium of claim 17, wherein the first and second lens characteristics comprises one of radiuses of curvature opposite the display, lens freeform coefficients, lens thicknesses, or lens materials.

19. The non-transitory machine readable medium of claim 17, wherein the zone not within any receiving zone of the primary lens array does not correspond to any portion of any imaging region of the display.

20. The non-transitory machine readable medium of claim 17, wherein the optical mapping comprises a pixel-to-pixel mapping between the ideal elemental image and the second elemental image.

21. The non-transitory machine readable medium of claim 20, wherein the optical mapping comprises a parametric model and distorting the ideal elemental image to the second elemental image comprises attaining coefficients of the parametric model and applying the parametric model to the ideal elemental image.

22. The non-transitory machine readable medium of claim 17, the machine readable medium comprising further instructions that, in response to being executed on the device, cause the device display stereo images by:

adjusting, prior to transmission the second elemental image for presentment, per-pixel brightness of the second elemental image.

23. The non-transitory machine readable medium of claim 22, wherein said adjusting is based on a transmission model of the optical path.

24. The non-transitory machine readable medium of claim 17, the machine readable medium comprising further instructions that, in response to being executed on the device, cause the device display stereo images by:

generating, based on the optical path, per elemental image brightness data comprising a brightness value for each of a plurality of elemental images comprising the second elemental image; and transmitting the per elemental image brightness data to the display.

\* \* \* \* \*